Patented Aug. 24, 1926.

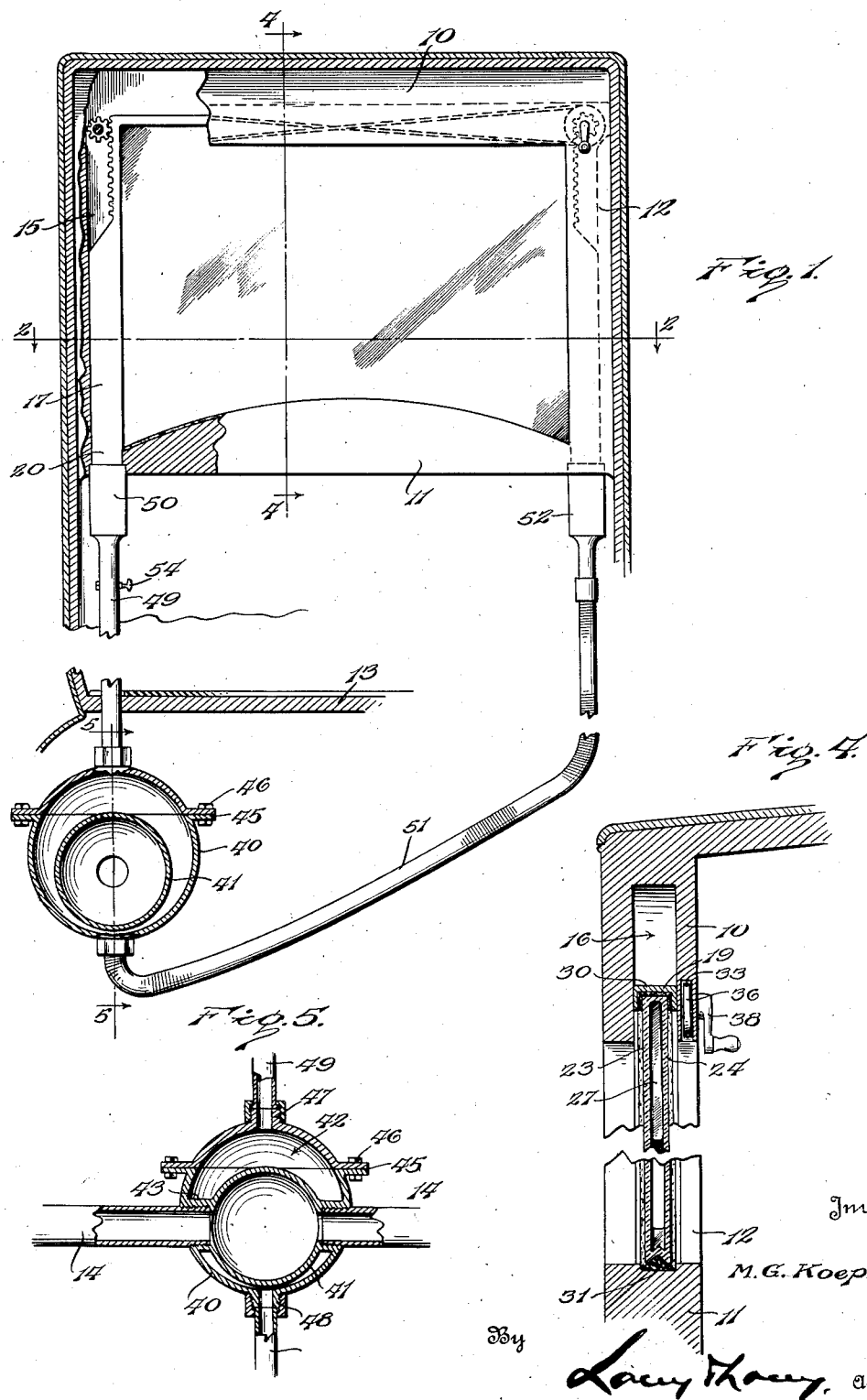

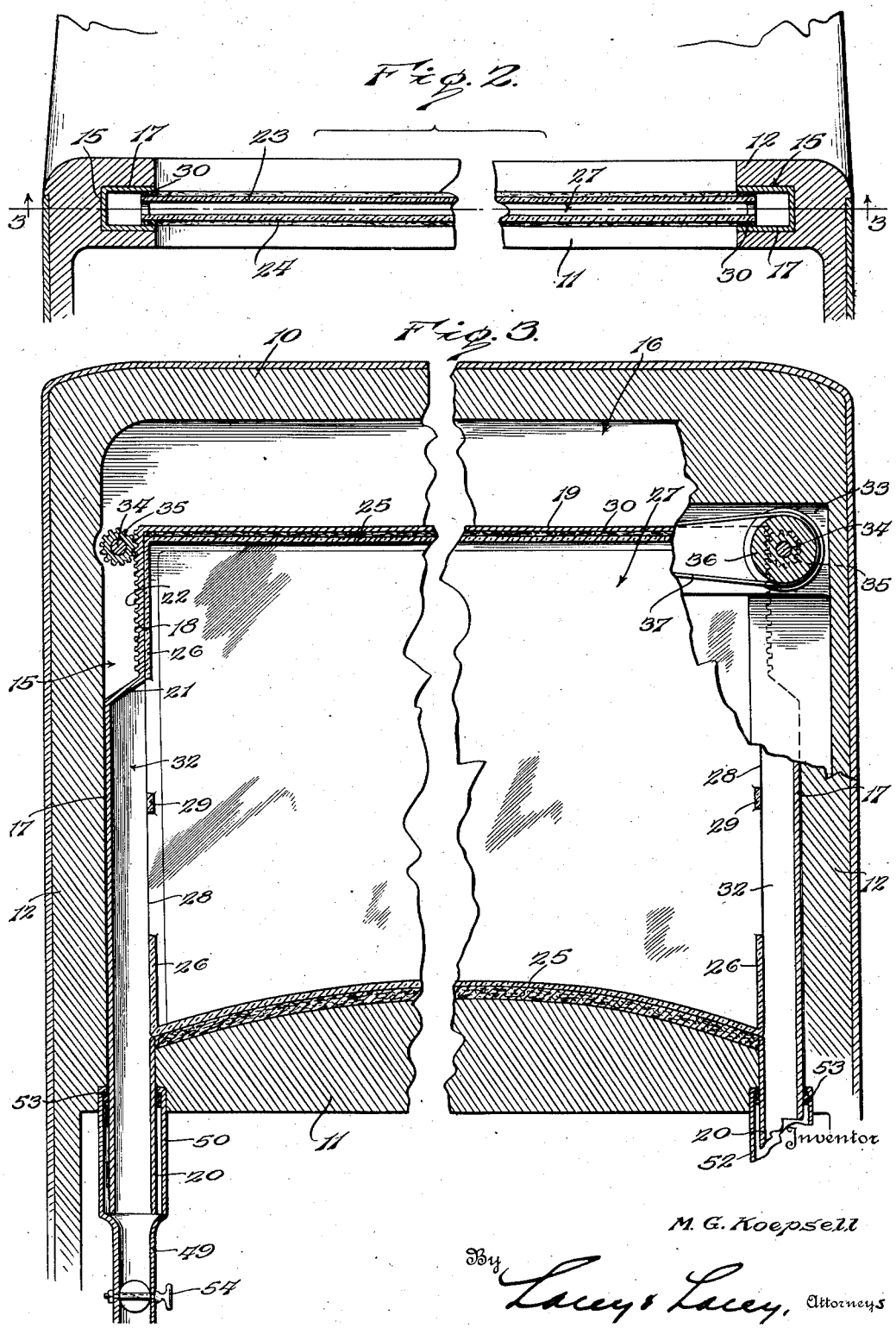

1,597,279

UNITED STATES PATENT OFFICE.

MARTIN G. KOEPSELL, OF ONAWAY, MICHIGAN.

WINDSHIELD.

Application filed August 29, 1925. Serial No. 53,365.

This invention relates to an improved windshield for motor vehicles and seeks, among other objects, to provide a windshield which will afford clear vision during frosty, rainy or foggy weather, or when it is snowing.

The invention seeks, as a further object, to provide a windshield in which the windshield glass may, when so desired, be heated for evaporating any moisture collected thereon and thus freeing the windshield of the bothersome obstruction to vision which such moisture generally causes.

The invention seeks, as a further object, to provide a windshield embodying an air chamber through which a current of heated air may, when desired, be caused to circulate for heating the windshield glass, while provision will be made for accommodating the raising and lowering of the glass.

And the invention seeks, as a still further object, to provide a novel mechanism for raising or lowering the windshield.

Other objects of the invention not above specifically mentioned will appear as the description proceeds.

In the accompanying drawings:

Figure 1 is a vertical sectional view showing my improved windshield installed, parts being illustrated in elevation.

Figure 2 is a horizontal sectional view on the line 2—2 of Figure 1, looking in the direction indicated by the arrows.

Figure 3 is an enlarged vertical sectional view through the windshield on the line 3—3 of Figure 2, looking in the direction indicated by the arrows.

Figure 4 is a transverse sectional view on the line 4—4 of Figure 1, looking in the direction indicated by the arrows.

Figure 5 is a detail sectional view on the line 5—5 of Figure 1, looking in the direction indicated by the arrows, this view particularly showing the heater.

Referring now more particularly to the drawings, the top, bottom and side rails of the front panel of a motor vehicle are indicated at 10, 11 and 12, while the floor is indicated at 13, and the exhaust pipe of the vehicle engine at 14. The side rails 12 are formed with vertical channels 15 at the upper ends of which is a channel 16 in the top rail 10, and slidably fitting in said channels is a preferably metallic windshield frame. The parallel side bars of this frame are formed with channel-shaped lower portions 17 at the upper ends of which said side bars are offset to provide channel-shaped upper portions 18 of less depth, and extending between the upper ends of the portions 18 is the channel-shaped upper end bar 19 of the frame. At the lower ends of the portions 17 are depending nipples 20 which extend freely through the bottom rail 11, while at the upper ends of said portions are end walls 21, and formed on the bottom walls of the portions 18 at their outer sides are racks 22. The frame is open at its lower end.

Fitting in the frame is a transparency which is preferably of glass and comprises a front pane 23, a spaced parallel rear pane 24, end walls 25 and side walls 26. The transparency is preferably an integral structure and may be blown or molded, as found most expedient. As will be seen, a heating chamber 27 is defined within the transparency, and formed in the side walls 26 are openings 28 medially of which are bracing web 29 extending between the front and rear panes 23 and 24. The transparency is freely received within the channels of the side and end bars of the windshield frame, and interposed between the side walls of said channels and the transparency are suitable packing strips 30 forming a sealed connection between the transparency and the frame. As shown in Figure 3, the packing strip at the top of the transparency is arranged to overlie the upper end wall thereof to provide a cushion, and countersunk in the bottom rail 11 of the front panel of the vehicle is a cushioning strip 31 for the lower end of the transparency. The strip 31 is triangular in cross section to present a V-shaped edge to the transparency and the lower end wall of the transparency is substantially V-shaped in cross section to fit said edge. As will be observed, the portions 17 of the side bars of the windshield frame are closed by the transparency to provide air passages 32 communicating with the chamber 27 of the transparency through the openings 28 and, as shown in Figure 3, said passages are closed at their upper ends by the end walls 21.

Formed in the top rail 10 of the front panel of the vehicle in the rear of the channel 16, as best seen in Figure 4, is a longitudinally extending slot 33, and journaled upon the panel at the ends of said slot are shafts 34 which project through the channel 16 at the ends thereof and carry pinions 35 to coact with the racks 22 of the windshield frame. Fixed to said shafts are pulleys 36 which are freely received in the ends of the slot 33, and trained about said pulleys is a belt 37 crossed between the pulleys for connecting the pulleys to turn in unison in opposite directions. Fixed to the rear ends of the shafts 34 are cranks 38. Thus, as will be appreciated, either crank may be operated for rotating the pinions 35 and raising or lowering the windshield.

Interposed in the exhaust pipe 14 is a heater comprising a spherical outer shell 40 and a spherical inner shell 41 located eccentrically within the outer shell to define an expansion chamber 42 at the upper portion of the heater. Connecting the inner shell with the outer shell are alined nipples 43 internally threaded to accommodate the adjacent ends of the pipe 14. The shell 40 is formed of sections, the uppermost of which provides a removable cap 44, and formed on the shell and cap are mating annular flanges 45 apertured at spaced points to accommodate bolts 46 securing the cap in position. Rising from the cap is a nipple 47, and depending from the shell 40 at its lower side is an alined nipple 48. Connected with the nipple 47 is a pipe 49 which, as shown in Figure 3, is provided at its upper end with a sleeve 50 slidably fitting over one of the nipples 20 at the lower ends of the side bars of the windshield frame, and connected to the nipple 48 is a pipe 51 provided at its upper end with a sleeve 52 slidably accommodating the other of the nipples 20 of said frame. The sleeves 50 and 52 are preferably fixed in suitable sockets in the bottom rail 11 of the front panel of the vehicle, and mounted in the upper ends of said sleeves are appropriate gaskets 53 which provide closed joints between the sleeves and nipples. The pipes 49 and 51 may be of any suitable character and may be covered with asbestos, if so desired. Mounted in the pipe 49 near the upper end thereof is a manually operable valve 54.

As will now be seen, when the vehicle engine is running, the shell 41 of the heater will be heated by the exhaust gases flowing through said shell. Accordingly, the air in the chamber 42 will, in turn, be heated so that when the valve 54 is opened, a current of heated air will rise through the pipe 49 to flow into the chamber 27 of the transparency of the windshield. Upon coming in contact with the windshield glass the air will, of course, be cooled to descend to the lower portion of said chamber and, as the cool air is displaced by the heated air rising through the pipe 49, the cool air will be returned through the pipe 51 to the heater. Upon entering the heater, the cool air will, of course, be again heated and thus caused to expand upwardly within the chamber 42, with the result that the expanding air being heated will tend to aspirate or siphon additional cool air from the lower portion of the chamber 27 of the transparency into the heater. Thus, as long as the valve remains open, heated air currents will be caused to flow through the chamber 25 of the transparency of the windshield for heating said transparency and evaporating any moisture thereon. Obstruction of vision through the windshield by such moisture will thus be minimized.

Having thus described the invention, what I claim is:

1. A windshield including a frame having air passages, a transparency mounted in the frame and provided with an internal air chamber communicating with said passages, a heater, and means connecting the heater with said passages to form an air conducting circuit for the flow of heated air from the heater and return thereto through said chamber.

2. A windshield including a frame having air passages, a transparency mounted in the frame and having spaced front and rear panes defining an air chamber communicating with said passages, a heater, and means connecting the heater with said passages to form an air conducting circuit for the flow of heated air from the heater and return thereto through said chamber.

3. A windshield including a frame having air passages, a transparency mounted in the frame and having front and rear panes connected by side and end walls, the side walls being provided with openings connecting said chamber with said passages, a heater, and means connecting the heater with said passages to form an air conducting circuit for the flow of heater air from the heater and return thereto through said chamber.

4. The combination with a motor vehicle having an engine exhaust pipe, of a windshield having a transparency provided with an internal air chamber, a heater interposed in said exhaust pipe, and means connecting the heater with said chamber to form an air conducting circuit for the flow of heated air from the heater and return thereto through said chamber.

5. In a motor vehicle windshield, a frame having channel-shaped side and end bars, a transparency mounted in the channels of said bars and provided with an internal air chamber, the side bars forming air passages communicating with said chamber, a heater, and means connecting the heater with said passages to form an air conducting circuit for the flow of heated air through said chamber and through the heater.

6. In a motor vehicle windshield, a frame having side bars provided with air passages and formed at their lower ends with nipples, a transparency mounted in the frame and provided with an internal air chamber communicating with said passages, a heater, pipes having sleeves accommodating said nipples and connecting the heater with said passages to form an air conducting circuit for the flow of heated air through said chamber and through the heater, and a valve in one of said pipes for controlling the circulation of the heated air.

7. In a motor vehicle windshield, a frame having air passages, a transparency mounted in the frame and provided with an internal air chamber communicating with said passages, a heater having an internal shell for connection with an engine exhaust pipe and a surrounding external shell defining an expansion chamber between the shells, and means connecting said expansion chamber with said passages to form an air conducting circuit for the flow of heated air from said expansion chamber and return thereto through said air chamber.

8. In a motor vehicle windshield, a frame having air passages, a transparency mounted in the frame and provided with an internal air chamber communicating with said passages, a heater including a spehrical inner shell for connection with an engine exhaust pipe and a spherical outer shell located eccentrically with respect to the inner shell to define an expansion chamber within the outer shell above the inner shell, and means connecting said expansion chamber with said passages to form an air conducting circuit for the flow of heated air from said expansion chamber and return thereto through said air chamber.

9. A windshield including a transparency having an internal air chamber, a heater, and means connecting the heater with said chamber to form an air conducting circuit for the flow of heated air from the heater and return thereto through said chamber, said circuit being closed to the atmosphere.

In testimony whereof I affix my signature.

MARTIN G. KOEPSELL. [L. S.]